United States Patent
Miekley et al.

(10) Patent No.: US 10,072,953 B2
(45) Date of Patent: Sep. 11, 2018

(54) FASTENING ASSEMBLY FOR A SENSOR ASSEMBLY AND SENSOR ASSEMBLY

(75) Inventors: Klaus Miekley, Ludwigsburg (DE); Rainer Willig, Tamm (DE); Berthold Rogge, Stuttgart (DE); Herbert Oechsner, Schoental (DE); Georg Konstantin, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 1629 days.

(21) Appl. No.: 13/501,064

(22) PCT Filed: Sep. 1, 2010

(86) PCT No.: PCT/EP2010/062782
§ 371 (c)(1),
(2), (4) Date: Aug. 1, 2012

(87) PCT Pub. No.: WO2011/045117
PCT Pub. Date: Apr. 21, 2011

(65) Prior Publication Data
US 2012/0292469 A1    Nov. 22, 2012

(30) Foreign Application Priority Data
Oct. 12, 2009  (DE) .................. 10 2009 045 557

(51) Int. Cl.
*G01D 11/24* (2006.01)
*G01D 11/30* (2006.01)

(52) U.S. Cl.
CPC .......... *G01D 11/245* (2013.01); *G01D 11/30* (2013.01)

(58) Field of Classification Search
CPC ............................. G01D 11/245; G01D 11/30
USPC ....................................................... 73/866.5
See application file for complete search history.

(56) References Cited

U.S. PATENT DOCUMENTS

| 3,826,339 | A | * | 7/1974 | Brokaw | ................. | F16F 7/108 |
| | | | | | | 174/42 |
| 5,321,991 | A | * | 6/1994 | Kalotay | ................. | 73/861.357 |
| 2002/0112526 | A1 | | 8/2002 | Mattes | | |
| 2004/0032821 | A1 | * | 2/2004 | Winterhalter | .......... | F16C 17/04 |
| | | | | | | 369/266 |

FOREIGN PATENT DOCUMENTS

| CN | 101435480 A | 5/2009 |
| DE | 36 24 160 A1 | 1/1988 |

(Continued)

OTHER PUBLICATIONS

International Search Report corresponding to PCT Application No. PCT/EP2010/062782, dated Nov. 30, 2010 (German and English language document) (5 pages).

*Primary Examiner* — Peter Macchiarolo
*Assistant Examiner* — Alexander Mercado
(74) *Attorney, Agent, or Firm* — Maginot, Moore & Beck LLP

(57) ABSTRACT

A fastening assembly for a sensor assembly has a metal bush and a fastener. It is possible for the metal bush to be connected via the fastener to a vehicle body. The sensor assembly includes at least one sensor module and an associated sensor assembly. The metal bush has a sleeve as a single-point fixing and a plate as a carrier unit for a carrier plate on which the at least one sensor module is arranged. The sleeve is led through a central through-passage in the carrier plate.

10 Claims, 7 Drawing Sheets

(56) References Cited

FOREIGN PATENT DOCUMENTS

| | | |
|---|---|---|
| DE | 101 03 047 C1 | 7/2002 |
| DE | 10 2007 058 965 A1 | 10/2009 |
| GB | 2 073 838 A | 10/1981 |
| GB | 2 254 668 A | 10/1992 |

* cited by examiner

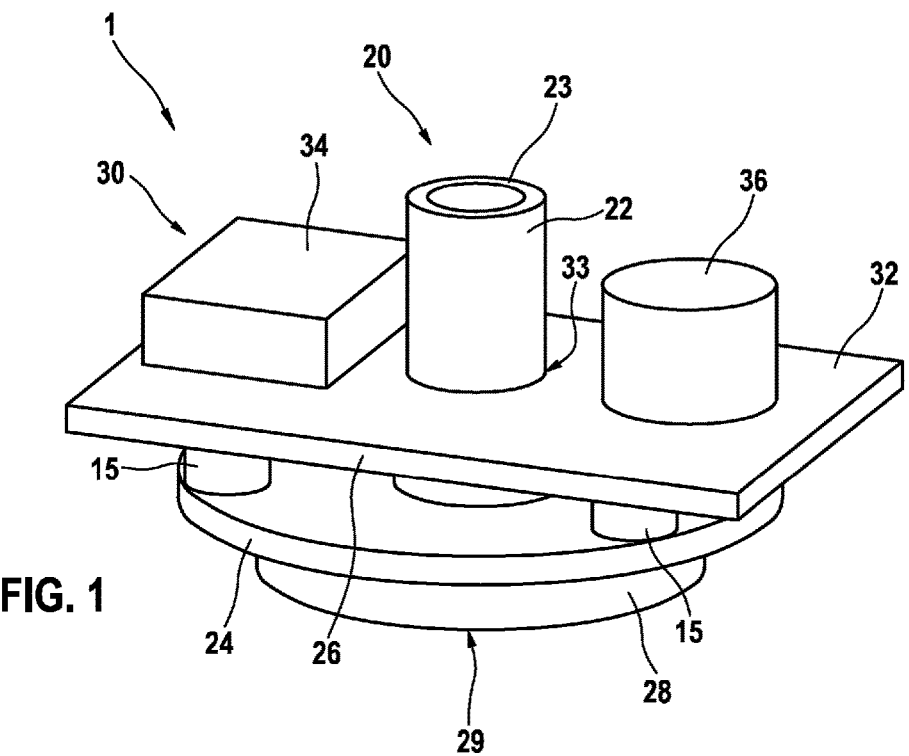

FASTENING ASSEMBLY FOR A SENSOR ASSEMBLY AND SENSOR ASSEMBLY

This application is a 35 U.S.C. § 371 National Stage Application of PCT/EP2010/062782, filed on Sep. 1, 2010, which claims the benefit of priority to Serial No. DE 10 2009 045 557.4, filed on Oct. 12, 2009 in Germany, the disclosures of which are incorporated herein by reference in their entirety.

BACKGROUND

The disclosure is based on a fastening assembly for a sensor assembly of the generic type of independent patent claim 1, and on a corresponding sensor assembly of the generic type.

Active and passive safety systems such as, for example, restraint systems such as, for example, airbags, seat belt pretensioners etc. as well as systems for controlling the vehicle movement dynamics such as, for example, ESP, ABS etc. are used in modern motor vehicles. An essential component of such systems are inertial sensors which are used to measure accelerations and/or yaw rates and/or rotation rates of the motor vehicle and are preferably embodied as micro-mechanical or micro-electromechanical sensors. During operation, such sensors are made to move in an oscillating fashion by suitable mechanical excitation, and forces and/or accelerations which occur are measured and evaluated.

German laid-open patent application DE 10 2007 058 965 A1 describes, for example, a motor vehicle sensor housing for a motor vehicle sensor having an insertion part. The described motor vehicle sensor housing is manufactured from polypropylene in a region of the insertion part in order to damp a sensor module which is arranged in/on the motor vehicle sensor housing. The motor vehicle sensor is preferably embodied as a micro-mechanical or micro-electromechanical sensor such as, for example, an inertial sensor which is preferably constructed as a rotation rate sensor or airbag-triggering sensor. The sensor module can be embodied in one piece with the sensor housing, or the two components can be permanently connected to one another by a mechanical connection. The insertion parts can be embodied, for example, as at least one metallic supporting bush which serves to support fastening forces acting on the sensor housing, which sensor housing is fastened to a fastening means on the bodywork.

A problem which frequently occurs when inertial sensors in motor vehicles are used is that of interference accelerations which can occur depending on the installation location of the sensor. These interference accelerations have a particularly large influence on the output signals of the sensor if they have frequencies in the region of an excitation frequency of the sensor or a natural frequency of the sensor assembly. On the basis of oscillation measurements and FEM analyses (FEM: Finite Element Method) it is possible to demonstrate that overshoot factors, which arise owing to eigenmodes of the housing, can interfere massively with signals of the inertial sensors. A particularly destructive influence is caused by the first eigenmodes in the frequency range from 30 Hz to 4 kHz. Within this frequency range, a relatively high degree of sensitivity of the inertial sensors, in particular of a two-axle acceleration element, can be detected.

SUMMARY

The disclosed fastening assembly for a sensor assembly, which comprises at least one sensor module, has the advantage that a metal bush comprises a sleeve as a single-point fixing means and a disk as a carrier unit for a carrier plate, on which the at least one sensor module is arranged, wherein the sleeve is led through a central passage in the carrier plate. In this context, the sensor assembly can be connected to the metal bush via a fastening assembly according to the disclosure, and suitable fastening means can be connected to a vehicle bodywork. The essential difference from the previous approaches is that the sensor assembly is now only fastened to a fastening assembly which is embodied as a central fixing means in the form of a single-point fixing means. For this purpose, the metal bush, which is configured to fix and to act as a function carrier, is used as a central element.

As a result of the proposed disclosed configuration, resonances can be shifted into uncritical frequency ranges above approximately 4 to 5 kHz, and influences of the carrier plate resonances and of other components which are connected to the carrier plate can be reduced by virtue of the fact that the sensor module is positioned on a region of the carrier plate which is not susceptible to interference. As a result, embodiments of the present disclosure permit housing configurations which are optimized in terms of vibration to be made available. This means that the natural frequencies of a housing which encloses the sensor assembly can advantageously be shifted into a frequency range which is above approximately 4 to 5 kHz. Since the eigenmodes of the housing constitute the main cause of interference in the sensor signal, it becomes clear how advantageous it is to decouple the eigenmodes of the housing. Embodiments of the disclosure not only permit natural resonances of the housing to be decoupled but also the overshoots on the carrier plate to be significantly reduced. Therefore, in particular the installation location of the at least one sensor module on the carrier plate can be decoupled from the eigenmodes of the housing. In addition, the dimensions of the housing can be reduced by virtue of the single-point fixing means.

The disclosed approach to a solution provides a multiplicity of configuration possibilities which are optimized in terms of vibration and fabrication thanks to the versatile geometry parameters and material parameters. Thanks to the effective decoupling of the eigenmodes of the housing by the metal bush, the configuration is therefore no longer reliant on a housing material which has a high modulus of elasticity, since the material no longer has to be selected in accordance with vibration criteria. For the housing, it is advantageously possible to use a cost-effective plastic which only has to satisfy the motor vehicle-specific requirements. Furthermore, the freedom in terms of configuration and materials permits targeted shifting of the eigenmodes of the carrier plate and of the overshoots associated therewith.

A further advantage of the novel housing concept is the dimensioning of the housing. As a result of the central fixing means, the overall dimensions of the sensor assembly depend directly on the diameter of the fastening means. A relatively small diameter therefore not only means a decrease in the overall dimensions, since a relatively small metal bush, a relatively small carrier plate and a relatively small housing are produced, but also a reduction in the weight and in the material costs. Apart from this, the miniaturization allows a greater degree of rigidity and therefore additional shifting of the natural frequencies.

As a result of the measures and developments specified in the disclosure, advantageous improvements of the fastening assembly for a sensor assembly are possible.

It is particularly advantageous that the metal bush is embodied as an insertion part and is inserted at least partially into a floor of a housing which surrounds the sensor assembly. The metal bush can therefore, for example, be particularly easily at least partially encapsulated using an injection-molding method.

In one refinement of the fastening assembly according to the disclosure, the carrier plate is coupled to the metal bush via a plurality of securing elements and/or at least one central support element. In this context, the carrier plate can be bonded to the securing elements and/or to the at least one central support element. A particularly simple embodiment is obtained if the securing elements and/or the at least one central support element are integrally molded onto the housing floor. This embodiment allows the number of parts to be advantageously reduced and the oscillation behavior to be improved further.

In a further refinement of the fastening assembly according to the disclosure, the carrier plate rests on the at least one central support element in the region of the passage. The central support element can, for example, be integrally formed on the housing floor as an annular collar which bears on the sleeve of the metal bush.

In a further refinement of the fastening assembly according to the disclosure, the plurality of securing elements are arranged between the carrier plate and the disk of the metal bush at predefined positions in such a way that the installation location of the at least one sensor module which is arranged on the carrier plate is decoupled in terms of vibration from the eigenmodes of the sensor assembly. As a result, the interference influences acting on the at least one sensor module can be advantageously reduced further.

In a further refinement of the fastening assembly according to the disclosure, the fastening means act on a support surface at the upper edge of the sleeve. Alternatively, the fastening means act on a support surface within the sleeve. This means that the support surface for the fastening means is arranged either in the region of the housing cover or in the region of the housing floor. From the point of view of vibration, the two embodiments behave very similarly. The fastening means is embodied, for example, as a screw with a screw head. Through skillful positioning of the securing elements it is possible to minimize very satisfactorily the overshoots on the carrier plate in the positioning area of the sensor module in both embodiments. Furthermore, it was possible to shift the eigenmodes of the disclosed configuration to higher frequencies by using the metal bush. Apart from the configuration which is optimized in terms of vibration, material costs and fabrication costs also played a decisive role for the practical implementation. Additional objectives in the development of sensor concepts are therefore the reduction in the mass and in the geometric dimensions. Since a large cutout is required for the screw head when the support surface is arranged in the sleeve, this embodiment has overall larger dimensions than the embodiment in which the support surface is arranged at the edge of the sleeve. Due to the relatively large bush dimensions, a relatively high mass and relatively large overall dimensioning occur. When the support surface is arranged outside the sleeve, the sensor assembly has a relatively large overall height. For this reason, the embodiment of the disclosed fastening assembly is selected as a function of the installation space available.

In a further refinement of the disclosed fastening assembly, the at least one sensor module is arranged on a first side of the carrier plate with respect to the sleeve and at least one further component is arranged on a second side of the carrier plate with respect to the sleeve. Arranging the components on various sides of the carrier plate prevents the natural resonances of the further components, which comprise, for example, a capacitor and/or a plug socket, from propagating to the sensor module side by virtue of the central fixation of the carrier plate.

As a result, the interference effects of the further components are advantageously decoupled in an effective way. In addition, corresponding electronic evaluation circuits in the sensor module can be integrated or arranged on the carrier plate.

In a further refinement of the fastening assembly according to the disclosure, the metal bush is embodied in two parts, wherein the sleeve is inserted into a corresponding opening in the disk. This advantageously permits mass production of the metal bush with relatively low expenditure on fabrication and costs. The two parts can be joined, for example, by welding or pressing. A circular shape or a rectangular shape can be selected for the geometry of the disk, which entails additional savings in terms of material and weight.

The fastening assembly according to the disclosure can be used for a sensor assembly having at least one sensor module which is arranged on a carrier plate.

The exemplary embodiments of the disclosure are illustrated in the drawings and are explained in more detail in the following description.

BRIEF DESCRIPTION OF THE DRAWINGS

FIG. 1 shows a schematic perspective view of a first exemplary embodiment of a sensor assembly according to the disclosure without a housing.

FIG. 2 shows a schematic plan view of the first exemplary embodiment (illustrated in FIG. 1) of the sensor assembly according to the disclosure without a housing.

DETAILED DESCRIPTION

In the accompanying FIGS. 1 to 18, identical reference symbols denote throughout elements and/or components which carry out identical or analogous functions.

Figure 3:
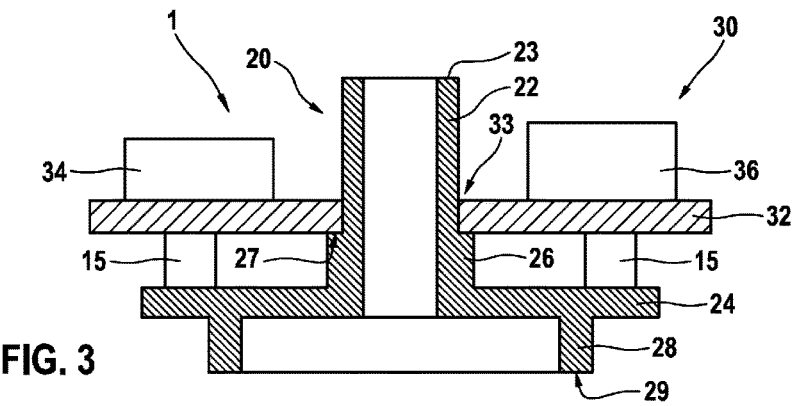
FIG. 3 shows a schematic sectional illustration of the first exemplary embodiment (illustrated in FIGS. 1 and 2) of the sensor assembly according to the disclosure without a housing, along the sectional line III-III in FIG. 2.

As is apparent from FIGS. 1 to 3, a first exemplary embodiment of a sensor assembly 1 according to the disclosure without a housing comprises a metal bush 20 and an electronic assembly 30 with a carrier plate 32, on which a sensor module 34 and a further component 36, embodied for example as a capacitor, is arranged. The sensor module 34 is embodied, for example, as what is referred to as an inertial sensor which comprises micro-mechanical or micro-electromechanical sensors and can be used to measure accelerations and/or yaw rates and/or rotation rates of the motor vehicle with respect to various spatial axes. In addition, the corresponding electronic evaluation circuits can be integrated in the sensor module 34 or arranged on the carrier plate 32. According to the disclosure, the metal bush 20, which is part of a fastening assembly according to the disclosure and can be connected to a vehicle bodywork (not illustrated) via fastening means (not illustrated), comprises a sleeve 22 as a single-point fixing means and a disk 24 as a carrier unit for the carrier plate 32. In this context, the sleeve 22 of the metal bush 20 is led through a central passage 33 in the carrier plate 32. In order to support the metal bush 20 on the vehicle bodywork (not illustrated), an annular collar 28 with a support surface 29 is integrally molded on the underside of the disk 24.

As is also apparent from FIGS. 1 to 3, the carrier plate 32 is coupled to the metal bush 20 via a plurality of securing elements 15, which are arranged between the carrier plate 32 and the disk 24 of the metal bush 20, and a central support element 26 which is embodied as an annular collar. In this context, the central support element 26, which is embodied as an annular collar, is integrally molded onto the sleeve 22 and the disk 24 in the first exemplary embodiment illustrated in FIGS. 1 to 3, with the result that the metal bush 20 is embodied in one part. The coupling between the securing elements 15, which are embodied, for example, as plastic domes, and the disk 24 of the metal bush 20 and/or between the securing elements 15 and the carrier plate 32, can be effected, for example, by bonding. In the region of the passage 33, the carrier plate 32 rests on a support region 27 of the central support element 26 which is embodied as an annular collar. The coupling between the central support element 26 and the carrier plate 32 can also be effected by means of bonding.

Figure 4:
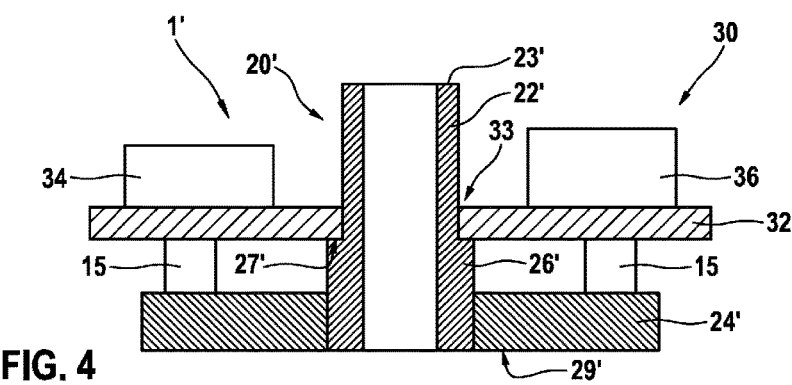
FIG. 4 shows a schematic sectional illustration of a second exemplary embodiment of a sensor assembly according to the disclosure without a housing.

As is apparent from FIG. 4, in the illustrated second exemplary embodiment of a sensor assembly 1' according to the disclosure, a central support element 26' which is embodied as an annular collar is integrally molded only onto a sleeve 22' of a metal bush 20' with a support region 27' for the carrier plate 32 with the result that in the second exemplary embodiment the metal bush 20' is embodied in two parts. In this context, the sleeve 22' is inserted, with the support element 26' which is integrally molded thereon and embodied as an annular collar, into a corresponding opening in the disk 24'. The joining of the two parts can be effected, for example, by welding or pressing. The coupling between the central support element 26' and the carrier plate 32 can also be effected by bonding. In the second exemplary embodiment illustrated in FIG. 4, the metal bush 20' rests on the vehicle bodywork (not illustrated) via an underside, embodied as a support surface 29', of the disk 24'.

Figure 5:
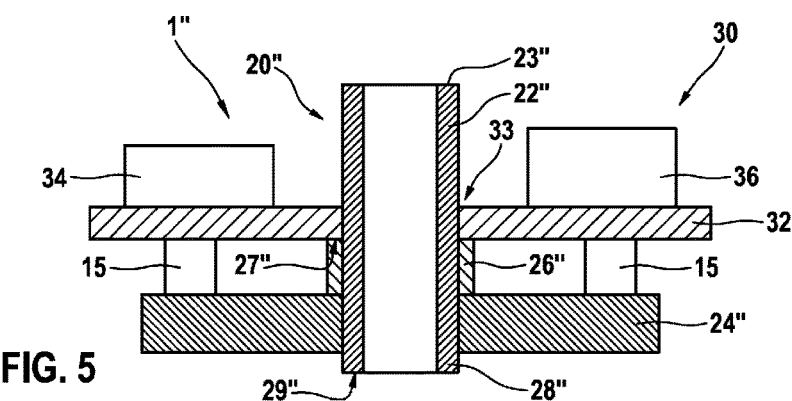
FIG. 5 shows a schematic sectional illustration of a third exemplary embodiment of a sensor assembly according to the disclosure without a housing.
Figure 6:
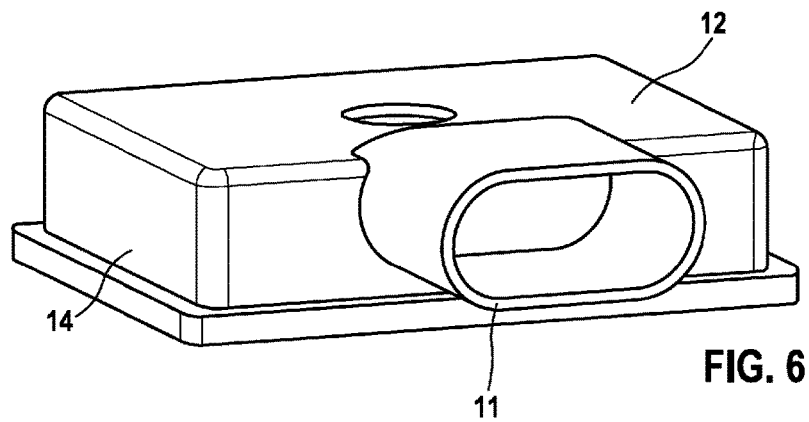
FIG. 6 shows a schematic perspective view of an exemplary embodiment of a housing cover for a first exemplary embodiment of a sensor assembly according to the disclosure with a housing.
Figure 7:
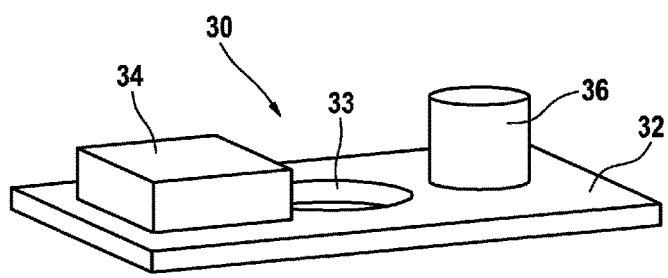
FIG. 7 shows a schematic perspective view of an exemplary embodiment of a carrier plate for the first exemplary embodiment of the sensor assembly according to the disclosure with a housing.
Figure 8:
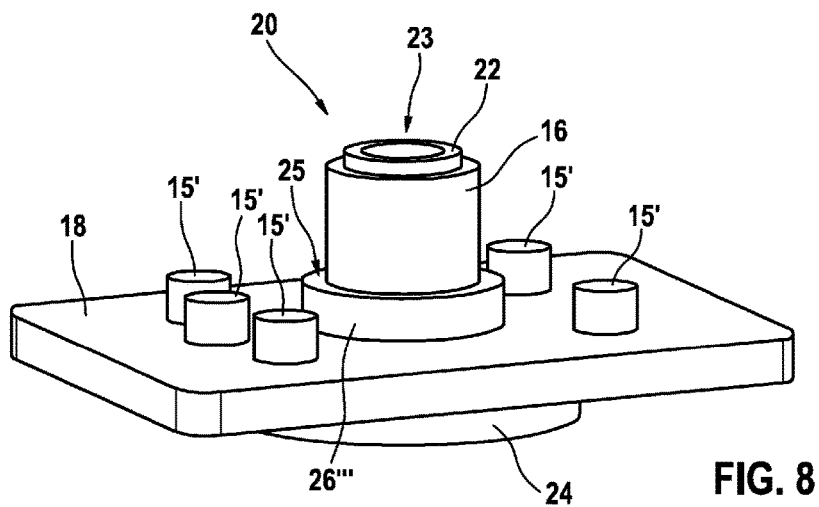
FIG. 8 shows a schematic perspective view of an exemplary embodiment of a housing floor with an inserted metal bush for the first exemplary embodiment of the sensor assembly according to the disclosure with a housing.
Figure 9:
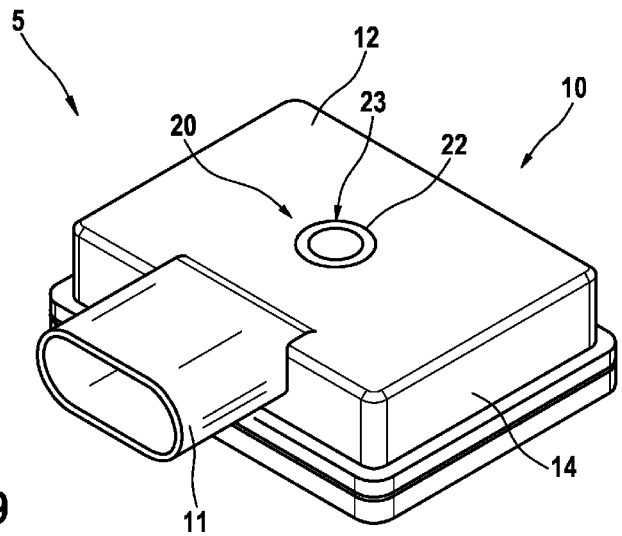
FIG. 9 shows a schematic perspective view from above of the first exemplary embodiment of the sensor assembly according to the disclosure with a housing.
Figure 10:
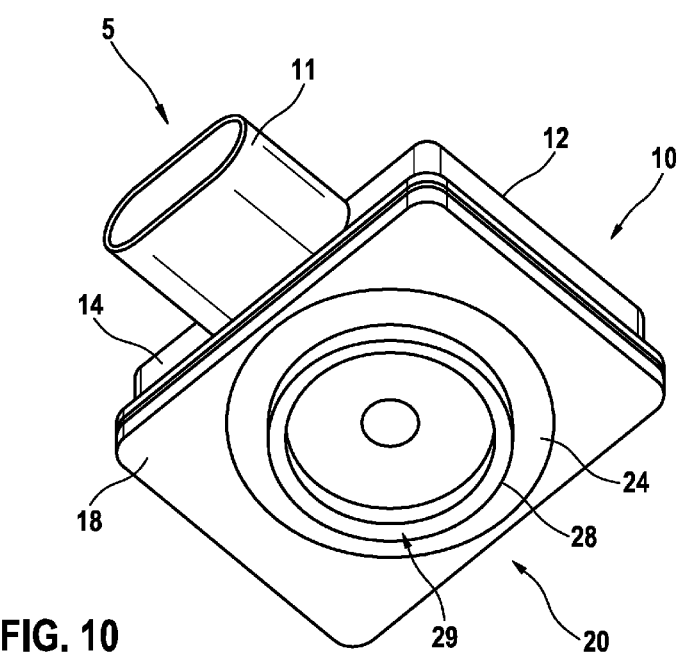
FIG. 10 shows a schematic perspective view from below of the first exemplary embodiment of the sensor assembly according to the disclosure with a housing.
Figure 11:
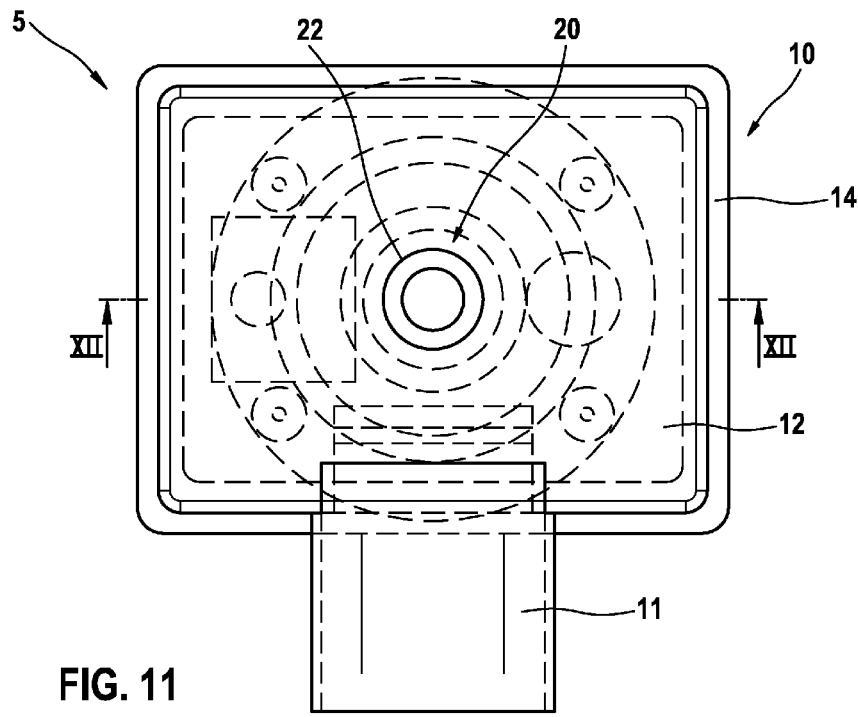
FIG. 11 shows a schematic plan view of the first exemplary embodiment of the sensor assembly according to the disclosure with the housing from FIGS. 9 and 10.

As is apparent from FIG. 5, in the illustrated third exemplary embodiment of a sensor assembly 1" according to the disclosure a central support element 26" is embodied as a ring with a support region 27" for the carrier plate 32 which ring is led through an inserted sleeve 22" of a metal bush 20". In a way which is analogous to the second exemplary embodiment, the metal bush 20" is also embodied in two parts in the third exemplary embodiment. In this context, the sleeve 22" is inserted into a corresponding opening in the disk 24". The joining of the two parts can also be effected, for example, by welding or pressing. The coupling between the central support element 26" and the carrier plate 32 or between the central support element 26" and the disk 24" of the metal bush 20" can also be effected by bonding. In order to support the metal bush 20" on the vehicle bodywork (not illustrated), the sleeve 22" projects as an annular collar 28 with a further support surface 29'" beyond the underside of the disk 24". Alternatively the sleeve can, in a way which is analogous to the second exemplary embodiment, be joined flush with the underside of the disk, and an additional annular collar can be arranged on the underside of the disk.

The two-part embodiment of the metal bush 20', 20" advantageously permits mass production of the metal bush 20', 20" with relatively low expenditure on fabrication and costs. For the geometry of the disk 24, 24', 24", a circular shape or a rectangular shape can be selected, which entails additional savings in terms of material and weight.

As is also apparent from FIGS. 1 to 5, embodiments of the sensor assembly 1, 1', and 1" according to the disclosure are only then fastened with a fastening assembly, embodied as a central fixing means, in the form of a single-point fixing means. For this purpose, the metal bush 20, 20', 20", which is configured to fix and to act as a functional carrier, is used as a central element. As a result of the proposed configuration according to the disclosure, resonances can be shifted into an uncritical frequency range and influences of resonance frequencies of the carrier plate 32 and of further components 36 which are connected to the carrier plate 32 are reduced, by virtue of the fact that the sensor module 34 is positioned on a region of the carrier plate 32 which is not susceptible to interference. As a result of the central fixing, the overall dimensions of the sensor assembly 1, 1', and 1" depend directly on the diameter of the fastening means (not illustrated), i.e. on the diameter of the sleeve 22, 22', and 22". A relatively small diameter therefore not only means a reduction in the overall dimensions, since a relatively small bush, a relatively small printed circuit board and a relatively small housing are produced, but also a reduction in the weight and in the material costs. Apart from this, the miniaturization permits higher rigidity and therefore additional shifting of the natural frequencies. Furthermore, the plurality of securing elements 15 between the carrier plate 32 and the disk 24 of the metal bush 20 are arranged at predefined positions in such a way that the installation location of the sensor module 34 which is arranged on the carrier plate 32 is decoupled in terms of vibration from eigenmodes of the sensor assembly 1, 1', 1". The optimum positions may be determined, for example, on the basis of trial structures with corresponding oscillation measurements and by simulations and/or FEM analyses. In order to advantageously effectively decouple the interference effects of the further component 36, the sensor module 34 is arranged on the left-hand side of the carrier plate 32 with respect to the sleeve 22, and the further component 36 is arranged on the right-hand side of the carrier plate 32 with respect to the sleeve 22. Arranging the components on various sides of the carrier plate 32 prevents the natural resonances of the further component 36 from propagating to the sensor module side by virtue of the central fixing of the carrier plate.

As is also apparent from FIGS. 1 to 5, the fastening means (not illustrated) in the illustrated exemplary embodiments can be led through the sleeve 22, 22', 22" of the metal bush 20, 20', 20" and respectively act on a support surface 23, 23', 23" at the upper edge of the sleeve 22, 22', 22".

The previously described embodiments of the sensor assembly 1, 1', and 1" according to the disclosure without a housing can be expanded, for example, by installing a second sensor module. The additional sensor module can be positioned, for example, on the underside of the carrier plate 32. Both sensor modules are therefore located in the region of the carrier plate 32 which is not susceptible to vibration. Since the dimensions increase only slightly, it is appropriate to configure a universal housing for both concepts. The use of a universal housing not only entails an enormous saving potential but also provides a decisive customer advantage. The customer can use the existing mount when this system is expanded, saving the development costs for a new mount. The previously described embodiments of the sensor assembly 1, 1', and 1" according to the disclosure without a housing can be used, for example, within a control unit, with the result that an additional housing for the sensor assembly 1, 1', and 1" is not necessary.

Two exemplary embodiments of a sensor assembly 5, 105 with a housing, which can be installed at any desired locations in the vehicle, are also described below.

As is apparent from FIGS. 6 to 12, in the illustrated first exemplary embodiment of a sensor assembly 5 according to the disclosure with a housing 10, the carrier plate 32 is arranged within the housing 10, which comprises a cover 12 which is embodied as a housing body and has an integrally molded-on plug socket 11 and integrally molded-on side walls 14 as well as a floor 18. As has already been stated, the metal bush 20, which is, for example, in one of the embodiments already described, serves as a central fixing unit and carrier unit. For the rest of the description it is assumed that the metal bush is embodied according to the first exemplary embodiment illustrated in FIGS. 1 to 3. The metal bush 20 is encapsulated as an insertion part using injection-molding technology with the floor 18 fabricated from plastic. In addition, the housing floor 18 contains the securing elements 15' which are embodied as plastic domes and which are used as carriers for the carrier plate 32. As has already been stated, the plurality of securing elements 15' are arranged between the carrier plate 32 and the disk 24 of the metal bush 20 at predefined positions such that the installation location of the sensor module 34 which is arranged on the carrier plate 32 is decoupled in terms of vibration from eigenmodes of the sensor assembly 5. In addition to the securing elements 15' which are embodied as plastic domes and which are arranged in the region of the disk 24, encapsulated by injection-molding, of the metal bush 20, a plastic ring 26''' is provided with a support region 25 around the sleeve 22 of the metal bush 20 as a central fixation of the carrier plate 32. The carrier plate 32 is fastened to the securing elements 15' and the central support element 26''', for example by bonding technology. By the disclosed assembly, it is possible to position the components 34, 36 on the carrier plate 32 in a way which is favorable in terms of vibration. The sensor module 34 is attached on the opposite side of the capacitor 36, with the objective of minimizing possible feedback of the natural resonances of the capacitor 36 to the sensor module 34. Furthermore, the eigenmodes of the sensor assembly 5 can be shifted to relatively high frequencies in a region above approximately 4 to 5 kHz via the use of the metal bush 20. Electrical contact is made by the plug socket 11 which is integrally molded onto the cover 12 which is embodied as a housing body. The housing cover 12 is also configured as an injection-molded component and contains pins (not illustrated here) configured to form electrical contact. The cover 12, embodied as a housing body, can be welded, for example by laser welding technology, to the housing floor 18, in order to seal the electronic assembly 30 off from the outside with respect to sprayed water. In addition, the housing 10 generates a damping effect, which acts positively on the signal behavior of the sensor module 34.

Figure 12:
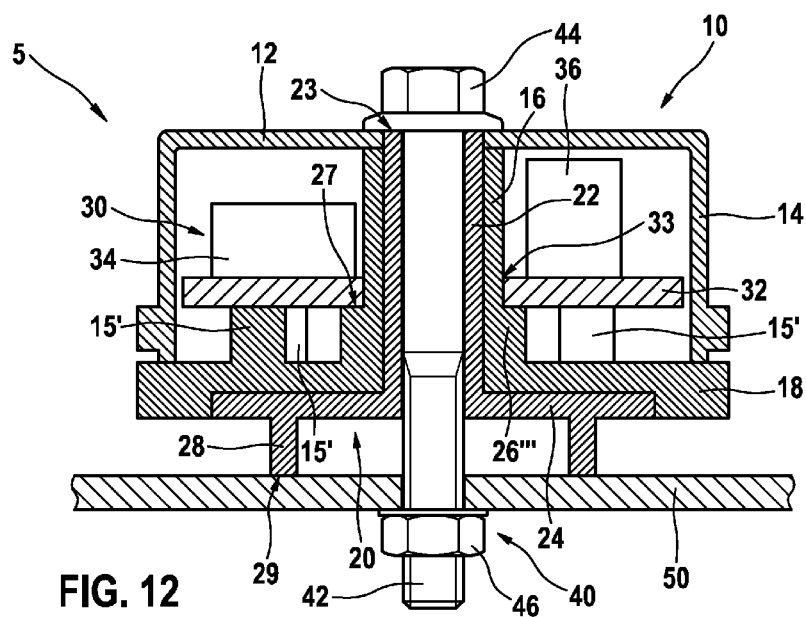
FIG. 12 shows a schematic sectional illustration of the first exemplary embodiment (illustrated in FIGS. 9 to 11) of the sensor assembly according to the disclosure with a housing, along the sectional line XII-XII in FIG. 11.
Figure 13:
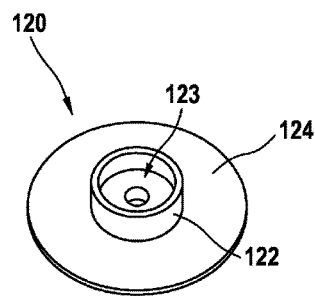
FIG. 13 shows a schematic perspective view of an exemplary embodiment of a metal bush for a second exemplary embodiment of a sensor assembly according to the disclosure with a housing.
Figure 14:
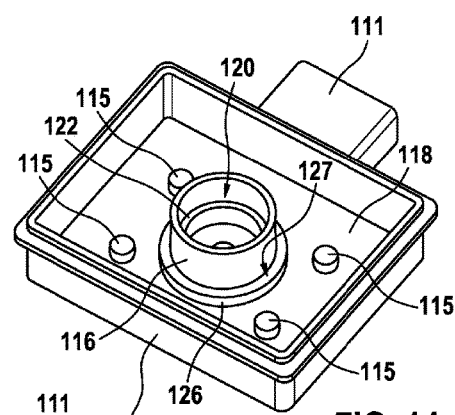
FIG. 14 shows a schematic perspective view of an exemplary embodiment of a further housing floor with the inserted metal bush, which is illustrated in FIG. 13, for the second exemplary embodiment of the sensor assembly according to the disclosure with a housing.
Figure 15:
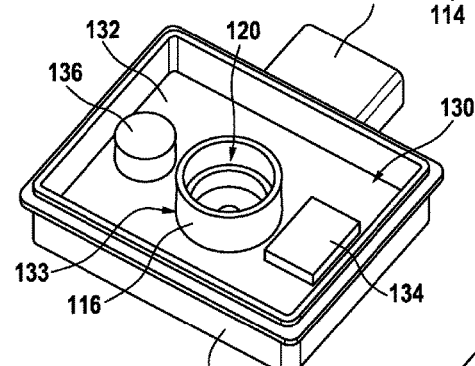
FIG. 15 shows a schematic perspective view of the exemplary embodiment of the housing floor illustrated in FIG. 14 with a transparently illustrated carrier plate for the second exemplary embodiment of the sensor assembly according to the disclosure with a housing.
Figure 16:
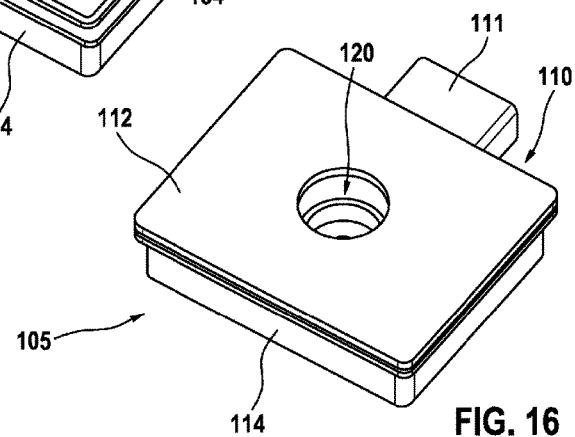
FIG. 16 shows a schematic perspective view of the second exemplary embodiment of the sensor assembly according to the disclosure with a housing.
Figure 17:
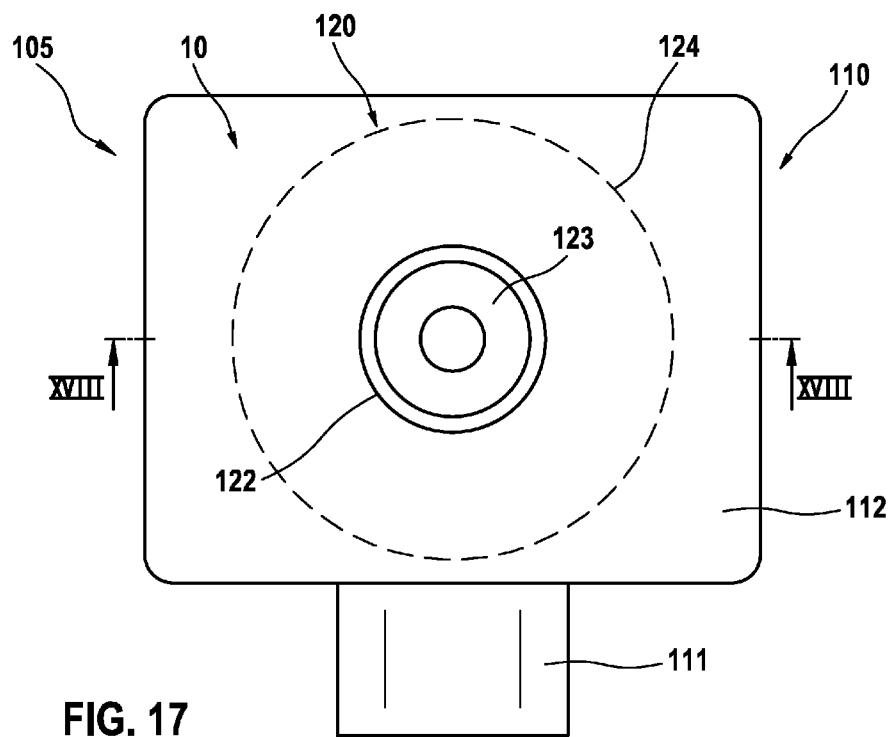
FIG. 17 shows a schematic plan view of the second exemplary embodiment of the sensor assembly according to the disclosure with the housing from FIG. 16.

As is also apparent from FIG. 12, the sensor assembly 5 is connected to the vehicle bodywork 50 via a fastening means 40, which comprises here, for example, a screw 42 with a screw head 44 and a fastening nut 46. Here, the screw head 44 acts on the support surface 23, which is arranged at the upper edge of the sleeve 22 in the region of the housing cover 12. The metal bush 20 is supported by the support surface 29 on the vehicle bodywork 50 via the annular collar 28 integrally molded on the underside of the disk 24. Alternatively, the screw 42 can be screwed into an internal thread (not illustrated) which is formed in the vehicle bodywork 50. In addition, a threaded bolt can be securely connected to the vehicle bodywork 50, wherein in this case the sleeve 22 of the metal bush 20 is plugged onto the threaded bolt, and wherein the sleeve 22 is secured by means of a nut which is screwed onto the threaded bolt and which acts on the support surface 23 at the upper edge of the sleeve 22.

As is apparent from FIGS. 13 to 18, in the illustrated second exemplary embodiment of a sensor assembly 105 according to the disclosure with the housing 110, the carrier plate 132 is also arranged within the housing 110, which comprises a floor 118 which is embodied as a housing body and has an integrally formed-on plug socket 111 and integrally molded-on side walls 114 as well as a cover 120. As has already been explained, a metal bush 120 serves as a central fixing unit and carrier unit. The metal bush 120 is at least partially encapsulated using injection-molding technology as an insertion part with the floor 118 fabricated from plastic. In addition, the housing floor 118 contains, in a way which is analogous to the first exemplary embodiment, securing elements 115 which are embodied as plastic domes and which are used as carriers for the carrier plate 132. As has already been stated, the plurality of securing elements 115 are arranged between the carrier plate 132 and a disk 124 of the metal bush 120 at predefined positions in such a way that the installation location of the sensor module 134 which is arranged on the carrier plate 132 is decoupled in terms of vibrations from eigenmodes of the sensor assembly 105. In addition to the securing elements 115 which are embodied as plastic domes and are arranged in the region of the disk 124, encapsulated by injection-molding, of the metal bush 120, a plastic ring 126 is provided with a support region 127 around the sleeve 122 of the metal bush 120 that is configured to centrally fix the carrier plate 132. The fastening of the carrier plate 132 to the securing elements 115 and the central support element 126 is effected, for example, by bonding technology. The assembly according to the disclosure enables the components 134, 136 to be positioned on the carrier plate in a way which is favourable in terms of vibrations.

In the second exemplary embodiment, the sensor module 134 is also attached to the opposite side of the capacitor 136, with the objective of minimizing possible feedback of the natural resonances of the capacitor 136 to the sensor module 134. Furthermore, the eigenmodes of the sensor assembly 105 can be shifted to relatively high frequencies in a region above approximately 4 to 5 kHz by the use of the metal bush 120. Electrical contact is made by of the plug socket 111 which is integrally molded onto the floor 118 which is embodied as a housing body. The housing cover 12 is also configured as an injection-molded component and can be welded to the housing floor 118 by, for example, laser welding technology, in order to seal the electronic assembly 130 off from the outside with respect to sprayed water. In addition, the housing 110 generates a damping effect, which acts positively on the signal behaviour of the sensor molecule 134.

Figure 18:
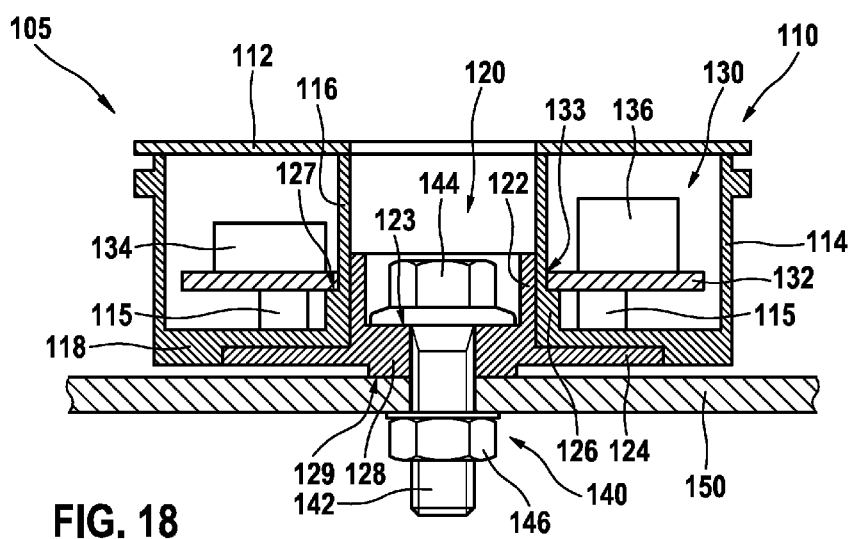
FIG. 18 shows a schematic sectional illustration of the second exemplary embodiment, illustrated in FIGS. 16 and 17, of the sensor assembly according to the disclosure with a housing, along the sectional line XVIII-XVIII in FIG. 17.

As is also apparent from FIG. 18, the sensor assembly 105 is connected to the vehicle bodywork 150 via fastening means 140 which comprises here, for example, a screw 142 with a screw head 144 and a fastening nut 146. Here, the screw head 144 acts on a support surface 123 which is arranged within the sleeve 122 in the region of the housing floor 118. The metal bush 120 is supported with a support surface 129 on the vehicle bodywork 150 via an annular collar 128 which is integrally molded on the underside of the disk 124. Of course, other fastening means which permit single-point fixing can also be used here.

In a further embodiment (not illustrated) of a sensor assembly according to the disclosure with a housing, the influence of the plug-type contacting process can be reduced further by virtue of the fact that the plug socket and the press-in pins for the plug-type contacting process are arranged as the capacitor on the side of the carrier plate lying opposite the sensor module. As a result, owing to the central fixing of the carrier plate by the metal bush virtually complete coupling of the plug vibrations can be achieved. A further aspect, which has not been mentioned hitherto, is the correct orientation of the sensor assembly when installation occurs in the vehicle. In conventional housings, correct adjustment during installation is ensured by two-point fixing. By eliminating the second fastening screw, the obligatory condition no longer arises. However, it can be implemented, for example, by a plastic mandrel in the housing floor. Said mandrel is plugged through a hole, provided for this purpose, at the installation location during mounting. The plastic mandrel provides the further advantage over two-point fixing of the sensor assembly being prevented from being mounted in an inverted fashion.

The embodiments of the disclosure advantageously permit, by virtue of the metal bush which serves as a central fixing unit and carrier unit and permits the "single-point fixing", resonance frequencies to be shifted into uncritical frequency ranges above approximately 4 to 5 kHz and a reduction in the influence of carrier plate resonances and of other components which are arranged on the carrier plate.

What is claimed is:

1. A fastening assembly for a sensor assembly comprising:
    a fastening mechanism;
    a carrier plate that includes a central passage;
    at least one sensor module positioned at an installation location on the carrier plate; and
    a metal bush configured to connect to a vehicle bodywork via the fastening mechanism, the metal bush including:
        a sleeve as a single-point fixing mechanism that passes through the central passage of the carrier plate and secures the carrier plate to the metal bush such that the installation location of the at least one sensor module on the carrier plate is vibrationally decoupled from a natural resonance of the sensor assembly; and
        a carrier unit configured to support the carrier plate.

2. The fastening assembly of claim 1, wherein the metal bush is embodied as an insertion part and is inserted at least partially into a floor of a housing which surrounds the sensor assembly.

3. The fastening assembly of claim 2, wherein the carrier plate is coupled to the metal bush via at least one of (i) a plurality of securing elements and (ii) at least one central support element.

4. The fastening assembly of claim 3, wherein the at least one of (i) the plurality of securing elements and (ii) the at least one central support element is integrally molded onto the floor of the housing.

5. The fastening assembly of claim 3, wherein the carrier plate rests on the at least one central support element in a region of the central passage.

6. The fastening assembly of claim 1, wherein:
    the carrier plate is coupled to the metal bush via a plurality of securing elements; and
    the plurality of securing elements are arranged between the carrier plate and the carrier unit of the metal bush at predefined positions in such a way that an installation location of the at least one sensor module which is arranged on the carrier plate is decoupled in terms of vibration from the natural resonance of the sensor assembly.

7. The fastening assembly of claim 1, wherein the fastening mechanism is configured to act on a support surface at an edge of the sleeve or on a support surface within the sleeve.

8. The fastening assembly of claim 1, wherein the at least one sensor module is arranged on a first side of the carrier plate with respect to the sleeve and at least one further component is arranged on a second side of the carrier plate with respect to the sleeve.

9. The fastening assembly of claim 1, wherein the metal bush is embodied in two parts, wherein the sleeve is inserted into a corresponding opening in the disk carrier unit.

10. A sensor assembly, comprising:
a carrier plate that includes a central passage;
at least one sensor module positioned on the carrier plate; and
a fastener assembly that includes:
   a fastening mechanism; and
   a metal bush configured to connect to a vehicle bodywork via the fastening mechanism, the metal bush having:
      a sleeve configured as a single-point fixing mechanism that passes through the central passage of the carrier plate and secures the carrier plate to the metal bush such that a resonant frequency of the carrier plate is shifted into an uncritical frequency range of the at least one sensor module; and
   a carrier unit configured to support the carrier plate.

* * * * *

UNITED STATES PATENT AND TRADEMARK OFFICE
CERTIFICATE OF CORRECTION

PATENT NO. : 10,072,953 B2
APPLICATION NO. : 13/501064
DATED : September 11, 2018
INVENTOR(S) : Miekley et al.

Page 1 of 1

It is certified that error appears in the above-identified patent and that said Letters Patent is hereby corrected as shown below:

In the Claims

In Column 10, Lines 65-67, Lines 1-3 of Claim 9 should read:
9. The fastening assembly of claim 1, wherein the metal bush is embodied in two parts, wherein the sleeve is inserted into a corresponding opening in the carrier unit.

Signed and Sealed this
Twenty-sixth Day of March, 2019

Andrei Iancu
*Director of the United States Patent and Trademark Office*